United States Patent [19]
Probst

[11] Patent Number: 4,768,574
[45] Date of Patent: Sep. 6, 1988

[54] VALVE FOR PNEUMATIC TIRES

[75] Inventor: Georg Probst, Geislingen, Fed. Rep. of Germany

[73] Assignee: Alligator Ventilfabrik GmbH, Giengen, Fed. Rep. of Germany

[21] Appl. No.: 868,139

[22] Filed: May 28, 1986

[30] Foreign Application Priority Data

Jun. 3, 1985 [DE] Fed. Rep. of Germany ....... 8516229

[51] Int. Cl.$^4$ ............................................. B60C 29/00
[52] U.S. Cl. ................................ 152/415; 29/157.1 R; 137/224; 137/232; 152/DIG. 11; 264/255
[58] Field of Search ............... 152/415, 427, 428, 429, 152/430, DIG. 11; 137/223, 232, 234.5; 138/109, 155, 89–89.4; 29/157.1 R, 157.1 A; 264/259

[56] References Cited

U.S. PATENT DOCUMENTS

| | | | |
|---|---|---|---|
| 3,712,326 | 1/1973 | Thacker | 137/223 |
| 4,294,301 | 10/1981 | Lutz | 137/223 X |
| 4,475,578 | 10/1984 | Nidle | 137/234.5 X |
| 4,538,658 | 9/1985 | Earley | 152/427 |

FOREIGN PATENT DOCUMENTS 538549 8/1941 United Kingdom ............... 152/429

Primary Examiner—Michael W. Ball
Assistant Examiner—Thomas Bokan
Attorney, Agent, or Firm—Bachman & LaPointe

[57] ABSTRACT

A valve for vehicle tires, in particular a snap-in valve, having a shell-like plastic material of a hardness in the condition as supplied of about 65 to 75 Shore A, which has a base portion for connection to a rim or the like and a valve cylinder having an external screwthread for a valve cap, wherein an axial opening in the valve cylinder, in the axial direction, is of different diameters and accommodates a valve insert which is mounted axially displaceably against a force storage means, is to be such that manufacture and also operational reliability are improved.

That is achieved in that the shell-like body is combined with the valve cylinder to provide a valve body (11) and same is produced in one piece from the plastic material in such a way that the hardness at the inside surfaces (26, 27) of the axial opening of the valve cylinder is higher, at least in the region adjoining the valve insert (12), than at the base portion (14). In that connection the harder region is to have a hardness of about 50 Shore D, in the condition as supplied.

10 Claims, 1 Drawing Sheet

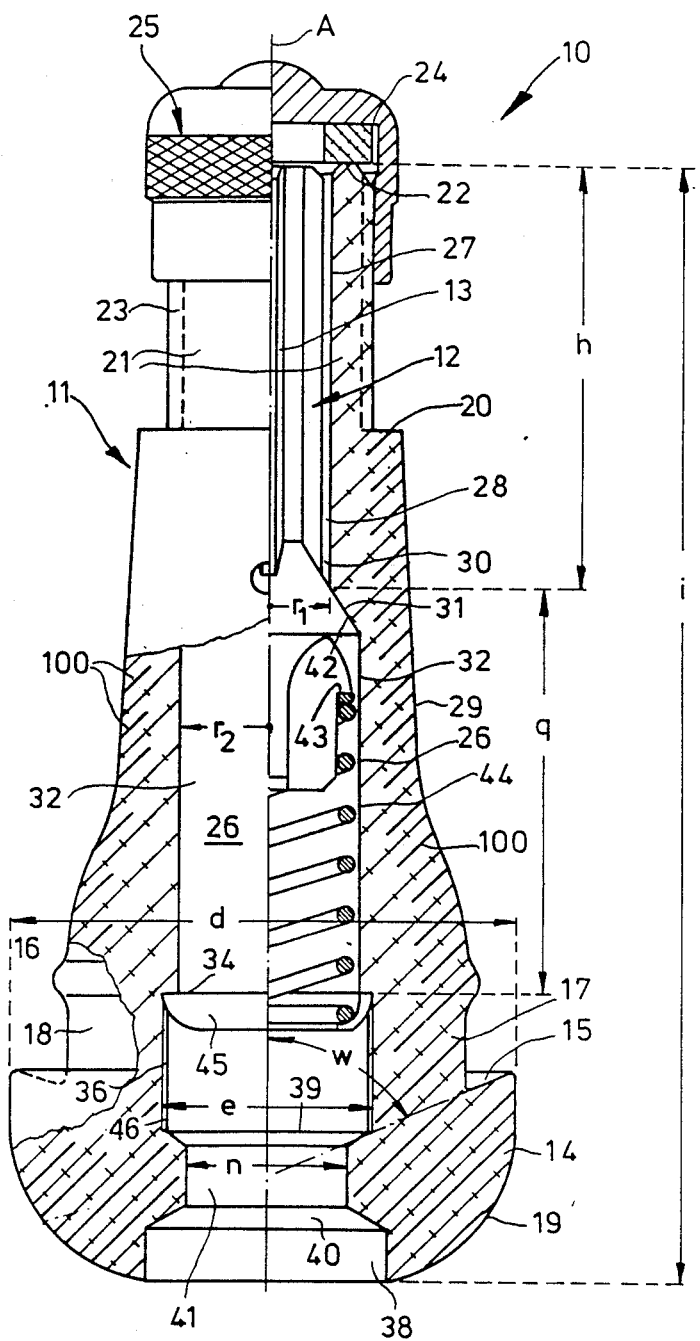

VALVE FOR PNEUMATIC TIRES

The invention relates to a valve for vehicle tires, in particular a snap-in valve, having a shell-like body comprising plastic material of limited elasticity, with a hardness in the condition upon delivery of about 65 to 75 Shore A, which has a base portion for connection to a rim or the like and a valve cylinder having an external screwthread for a valve cap, wherein an axial opening in the valve cylinder, in the axial direction, is of different diameters and accommodates a valve insert which is mounted axially displaceably against a force storage means. The invention also concerns a method of producing that valve.

Valves of that kind are fixed in regard to dimensions and shape by DIN-Standard 7780, for tubeless vehicle tires, for example in the form of rubber valves and, by virtue of the elasticity of their shell-like body of rubber, permit rapid fitting into a tire rim. The body is of a pear-like contour and surrounds the metal valve cylinder in such a way that the valve cylinder sticks up with its external screwthread from out of an annular terminal edge of the rubber body. Extending within the metal cylinder is the valve insert between which and the inside surface of the metal cylinder extends an annular flow gap. The axial force storage means is formed by a coil spring which is supported at its base end against a part of the metal cylinder; the latter may also be mounted separately from the upper portion of the metal cylinder.

In consideration of that state of the art, the inventor set himself the aim of improving the construction of the valve and therewith the manufacture thereof as well as its operational reliability.

That aim is achieved in that the shell-like body is connected to the valve cylinder to provide a valve body and same is produced in one piece from the plastic material in such a way that the hardness at the inside surfaces of the axial opening in the valve cylinder is higher at least in the region adjoining the valve insert than at the base portion. In that respect the higher material hardness value is to be of about 50 Shore D hardness in the condition as supplied.

There is therefore proposed a valve structure which is different from the state of the art and in which the usual individual components are reduced; the metal valve cylinder is eliminated and instead the shell-like body has formed-out portions towards the longitudinal axis of the valve, which replace the valve cylinder. However, such a step would not be operational if the impact-ball hardness prescribed in accordance with DIN-Standard 7780 were retained, for which reason in accordance with the invention there is the further feature that the proposed novel valve body is offered in different hardnesses; the hardness of the surfaces adjoining the valve insert must in any event be higher than the hardness of those parts which for example are required for the clamping operation to the rim.

It would be an expensive procedure if the valve body according to the invention were to be made up of a number of layers of different hardnesses. Instead of that it is preferred to provide a stepless transition between the softer regions and the harder regions, which is made possible by virtue of the method according to the invention. In that method, a soft plastic material is first introduced into an injection mould for the valve body, said plastic material forming the subsequent base region and the outside surfaces of the valve body, and then harder plastic material is injected, which molds closely to the core wall of the injection mold. That method according to the invention provides the desired stepless transition and an intimate connection between the plastic materials of different hardnesses.

It is also in accordance with the scope of the invention for the harder region to include a cylindrical part of the valve body with the external screwthread, that is to say the end portion of the metal valve cylinder, which sticks out of the shell-like body and carries the valve cap.

It has been found to be advantageous for the valve body itself, between an upper axial bore and a lower axial bore, to have a seating cone portion which enlarges towards the latter and which serves as an abutment for the valve insert which is movable by virtue of the force storage means.

The lower bore of the valve body blends into a base space or chamber in which the bottom of the force storage means is supported, more particularly, preferably on a mounting portion in the base chamber which can be readily introduced thereinto and which is then fixed in position between an annular desk surface and an abutment shoulder. Preferably therefore the region of the valve body according to the invention, which surrounds the base chamber, is also of comparatively soft plastic material or lies in the transitional range between same and the harder plastic material at the above-described inside walls of the bore.

In general it has been found that a valve body of that kind provides the desired simplification in manufacture and in addition affords a high level of operational reliability.

BRIEF DESCRIPTION OF THE DRAWINGS

Further features, advantages and details of the invention will be apparent from the following description of a preferred embodiment, with reference to the drawing; the single FIGURE in the drawing shows a view in longitudinal section through a valve 10.

| Reference Numeral | Designation |
| --- | --- |
| 10 | valve |
| 11 | valve body |
| 12 | valve insert |
| 13 | valve bore in 12 |
| 14 | base portion in 11 |
| 15 | annular surface on 14 |
| 16 | bead |
| 17 | cylinder portion |
| 18 | annular groove |
| 19 | part-spherical surface of 14 |
| 20 | step in 11 |
| 21 | cylindrical collar of 11 |
| 22 | annular edge of 21 |
| 23 | external screwthread in 21 |
| 24 | elastic ring in 25 |
| 25 | valve cap |
| 26 | wall of 32 |
| 27 | wall of 28 |
| 28 | bore in 11 |
| 29 | outside surface of 11 |
| 30 | annular gap |
| 31 | seat cone portion |
| 32 | bore in 11 |
| 33 | unused |
| 34 | abutment shoulder 32-36 |
| 35 | unused |
| 36 | base chamber |
| 37 | unused |

| | -continued |
|---|---|
| | Designation |
| 38 | opening on 19 |
| 39 | desk surface |
| 40 | desk surface |
| 41 | bore portion |
| 42 | surface of 12 on 31 |
| 43 | should of 12 |
| 44 | axial spring |
| 45 to 90 | unused |
| 100 | hatching |
| Reference Letter | |
| d | diameter of 11 |
| e | diameter of 36 |
| h | length of 28 |
| i | length of 11 |
| n | diameter of 41 |
| q | length of 31 + 32 |
| w | angle 15.17 |
| A | longitudinal centre line of the valve |

In a valve body 11 of a length i of for example 42.5 mm and a maximum diameter d of 19.5 mm, the valve 10 has a valve insert 12 with an axial valve bore 13.

The maximum diameter d is determined by a part-spherical base portion 14 of the valve body 11; the base portion 14 terminates at a shoulder-like annular surface 15 which is inclined towards the base of the valve at an angle w of 65° relative to the longitudinal centre line A of the valve, and with a bead 16 of an adjoining cylindrical portion 17, delimits an annular groove 18 for receiving the edge (not shown) of a hole in a rim.

Above the bead 16 the valve body 11 tapers to a second shoulder-like step 20 which is adjoining by a cylindrical collar 21 having an external screwthread 23 which extends from the shoulder-like step 20 to an annular edge 22. A valve cap 25 is screwed on to the screwthread 23, with the interposition of an elastic ring 24 which bears against the annular edge 22.

An axial opening passes through the above-described valve body 11 over the entire length i thereof. The upper part of the axial opening, which is surrounded by the collar 21, is formed as a cylindrical or axial bore 28 with a radius $r_1$, for the purposes of receiving the valve insert 12. The wall 27 of the bore, with the valve insert 12, delimits an annular gap 30. At its end which is the lower end in the drawing, the bore 28 with the radius $r_1$ merges into one side of a set cone portion 31 which increases in size towards the base and which at the other side adjoins the wall 26 of a cylindrical or axial bore 32 of a radius $r_2$. The length h of the upper bore 28 and the length q of the lower bore 32 together with the seat cone portion 31 are substantially equal to each other and measure more than one third of the length i of the valve body.

The lower bore 32 terminates in the radial region of the outward bead 16, forming an abutment shoulder 34 at a base space or chamber 36 of a diameter e. Disposed between the chamber 36 and an opening 38 which extends from the part-spherical surface 19 of the base portion 14 is a narrow bore portion 41 of a diameter n, which is delimited by desk surfaces 39 and 40.

The individual parts of the valve insert 12 are not shown in greater detail, for the sake of simplicity of the drawing. It will be seen however that a surface 42 of the valve insert 12, which is inclined away from the longitudinal centre line A of the valve, bears against the seat cone portion 31 by virture of the force of an axial spring 44. The axial spring 44 is supported at one end against a shoulder 43 on the valve insert 12 and at the other end in a mounting portion or support channel 45 in an insert 46 which in turn rests on the upper surface 39 and is fixed between same and the abutment shoulder 34.

Air which is forced in through the annular gap 30 urges the valve insert 12 away from the seat cone portion 31 against the force of the axial spring 44; when the introduction of air is terminated, the surface 42 of the valve insert 12 moves back into contact with the seat cone portion 31.

An aspect of substantial significance is that the valve body 11 consists altogether of plastic material, more specifically in such a way that in the part-spherical region and at its outside surface 29 which extends as far as the step 20, it is of a lower level of hardness than at the inside surfaces which delimit the bores 28, 31, 32 or the axial opening, for example at the walls 26 and 27 of the bore and the seat cone portion 31. The drawing shows additional hatchings 100 in the softer region, to make that clear.

The hardness of the material in the condition as supplied, which is determined in the form of impact-ball hardness, is at about 65 Shore A in the softer region 100, increasing to about 50 Shore D towards the longitudinal centre line A of the valve.

In manufacture of such a valve body 11, in a mold for determining the contours thereof, the softer plastic material is passed to the outside surface of the mold and then a harder plastic material is introduced in the vicinity of the longitudinal centre line. That gives rise to a molecular bond between the two regions, in which respect it is a matter of secondary significance whether the boundary of the impact-ball hardness regions produces a theoretical separation surface of whether there is a gradual transition which can no longer be clearly ascertained. At any event, that method provides that the valve body 11 is on the one hand in one piece but on the other hand has both resilient zones, for example in the region of the annular groove 18, and also hard surfaces, as is required in particular in the vicinity of the valve insert 12.

I claim:

1. A valve for vehicle tires which comprises:
   a one-piece, all plastic valve body including a base portion for connection to a rim and a valve cylinder accommodating an axially displaceable valve insert;
   said base portion being formed from a first injection moldable plastic material of limited elasticity having a hardness of from about 65 to 75 Shore A forming a softer portion of the valve body;
   said valve cylinder having an external screwthread for a valve cap and an axial opening having different diameters in the axial direction;
   a force storage means;
   said valve insert being positioned within said axial opening and being axially displaceable against said force storage means;
   said valve cylinder further having harder portions at internal surfaces defining said axial opening in the region adjoining said axially displaceable valve insert and the force storage means formed from a second injection moldable plastic material having a hardness of about 50 Shore D; and
   a stepless transition between the harder and softer portions of said valve body.

2. A valve as set forth in claim 1 wherein the second injection moldable plastic material is molecularly bonded to the first injection moldable plastic material.

3. A valve as set forth in claim 1 wherein a part of said valve cylinder including said external screwthread is formed from said second injection moldable plastic material.

4. A valve as set forth in claim 1 wherein:
the valve body has a seat cone portion between an upper axial bore and a lower axial bore; and
said seat cone portion increases in size towards the lower axial bore.

5. A valve as set forth in claim 4 wherein the lower axial bore terminates at a base chamber in which the bottom of the force storage means is supported.

6. A valve as set forth in claim 5 wherein the force storage means is supported against a mounting portion in the base chamber.

7. A valve as set forth in claim 6 wherein the base chamber accommodates an annular desk surface as a support surface for the mounting portion for the force storage means.

8. A valve as set forth in claim 7 wherein the base chamber opposite the desk surface has an abutment shoulder for fixing the mounting portion.

9. A valve as set forth in claim 8, wherein the mounting portion for the force storage means comprising an annular channel which is held clampingly in the base chamber of the valve body.

10. A valve as set forth in claim 1 wherein the plastic material in the softer portion of the valve body has a hardness of about 65 Shore A.

* * * * *

UNITED STATES PATENT AND TRADEMARK OFFICE
CERTIFICATE OF CORRECTION

PATENT NO.   : 4,768,574

DATED        : September 6, 1988

INVENTOR(S)  : GEORG PROBST

It is certified that error appears in the above-identified patent and that said Letters Patent is hereby corrected as shown below:

Column 3, line 32, change "adjoining" to --adjoined--.

Column 3, line 46, change "set" to --seat--.

Column 3, line 66, change "virture" to --virtue--.

Column 4, line 35, change "of" to --or--.

Column 6, Claim 9, line 12, change "comprising" to --comprises--.

Signed and Sealed this

Twenty-eighth Day of February, 1989

Attest:

DONALD J. QUIGG

Attesting Officer

Commissioner of Patents and Trademarks